United States Patent [19]
Griset

[11] 4,394,800
[45] Jul. 26, 1983

[54] GUIDE CLAMP

[76] Inventor: Norman Griset, 380 Jennifer La., Orange, Calif. 92669

[21] Appl. No.: 326,840

[22] Filed: Dec. 3, 1981

[51] Int. Cl.³ .............................................. B43L 13/02
[52] U.S. Cl. ......................................... 33/443; 33/42; 33/32 C; 83/614
[58] Field of Search ............... 33/32 C, 32 R, 42, 443, 33/445, 448, 430, 434, 437; 83/614, 624, 625, 626, 582, 613, 745, 444, 445

[56] References Cited

U.S. PATENT DOCUMENTS

| | | | |
|---|---|---|---|
| 2,273,716 | 2/1942 | Louviaux et al. | 33/32 C |
| 2,577,159 | 12/1951 | Jeferow | 33/345 |
| 2,773,523 | 12/1956 | Hopla | 33/42 |
| 3,127,680 | 4/1964 | Brichard et al. | 33/32 C |
| 3,287,808 | 11/1966 | Fortune | 33/32 C |
| 4,095,345 | 6/1978 | Smith | 33/443 |

FOREIGN PATENT DOCUMENTS

2829071 1/1980 Fed. Rep. of Germany ........ 33/443

*Primary Examiner*—Willis Little
*Attorney, Agent, or Firm*—Cantor and Lessler

[57] ABSTRACT

A guide clamp is disclosed which includes a clamping jaw at one end of a guide bar. An opposing shifting jaw is slidably carried on the guide bar to permit a workpiece to be embraced by the jaws. A pull rod associated with and parallel to the guide bar is connected to a lever on the clamp jaw. The shifting jaw locks onto this pull rod when the jaws embrace a workpiece and actuation of the lever then pulls the jaws together to clamp onto the workpiece and hold the guide clamp thereon. Tuideways to guide and hold tools, jigs and the like are provided on the guide bar.

17 Claims, 20 Drawing Figures

GUIDE CLAMP

The present invention relates to tool guiding and marking devices and more particularly to guides and markers which are clamped to a workpiece. As such, the invention will be hereinafter called a "guide clamp".

Guide clamps are not new and the patent to William J. Fortune, U.S. Pat. No. 3,287,808 is exemplary of the prior art. The basic features of a guide clamp include a guide bar having a pair of gripping jaws at one side of the bar to clamp onto a workpiece such as a board. One jaw, the clamping jaw, is at one end of the bar. The other jaw, the shifting jaw, may be positioned along the reach of the bar to bring the jaws against the edges of the workpiece and the clamping jaw will then secure the guide clamp onto the workpiece. The guide clamp may be used for various purposes such as for marking or as an abutment for a power hand saw which is held against the guide clamp as it makes a cut across the workpiece.

The present invention, an improved guide clamp, was conceived and developed to make possible a heretofore unrealized potential for such a tool, especially for precision and custom woodworking. A conventional guide clamp can serve as a guiding abutment for a power hand saw but the guide clamp is not always satisfactory for other types of power hand tools such as a router. The vibration and other action of such a tool can move the tool away from the edge of the guide clamp even when it is tightly held. An improved guide clamp which will positively hold and guide a tool across a workpiece is needed. Also, a guide clamp which can be precisely positioned on a workpiece to hold jigs and the like for precision operations is needed.

Accordingly, an object of the present invention is to provide a novel and improved guide clamp which will hold a power hand tool, such as a router, in proper position and in precise alignment as it moves across a workpiece along a path established by the guide clamp.

Another object of the invention is to provide a novel and improved guide clamp and auxiliary attachments for it which permits small, light-weight power hand tools, and other special tools, to be used for precision woodworking operations which are ordinarily performed on table saws and with other heavy machinery and permits lightweight manual tools to match or even exceed the performance of table saws and other shop machinery.

Another object of the invention is to provide a novel and improved guide clamp which can be quickly and easily mounted upon a workpiece, in a fraction of the time a standard clamp can be so mounted, and can be secured to the workpiece by the simple pushing of a lever, and with no portion of the jaws or other parts of the clamp projecting below the workpiece so that the workpiece will lie flatly upon a bench or table with the guide clamp in place.

Another object of the invention is to provide a novel and improved guide clamp having precisely aligned guiding edges which will not deflect or warp by stresses created whenever the guide clamp is tightly fitted upon the workpiece.

Another object of the invention is to provide, in a novel and improved guide clamp, an adjustable shifting jaw which is easily moved along the clamp bar in either direction and to any selected position to automatically lock in place at the selected position.

Another object of the invention is to provide a novel and improved guide clamp structure which may be easily modified to serve as a portable, long-reaching bench clamp for holding a workpiece at the top or side of a work bench and wherein the vice jaws extend above the clamp surface only a short distance to be below the working surface of a thin board or workpiece.

Another object of the invention is to provide a novel and improved guide clamp which is easily portable and combines in a single unit the ability to be a woodworking clamp, an accurate straight edge, an accurate and safe guide for hand tools and as a base on which other tools may be affixed.

Yet other objects of the invention is to provide a novel and improved guide clamp which may be manufactured primarily from extruded and molded components to form a simple, reliable, neat-appearing, low-cost, rugged and durable unit.

Yet another object of the invention is to provide, in combination with a guide clamp, an improved and simplified squaring arm and gauge and an improved doweling jig for precise hole drilling.

With the foregoing and other objects in view, all of which more fully hereinafter appear, my invention comprises certain constructions, combinations and arrangements of parts and elements as hereinafter described, defined in the appended claims and illustrated in preferred embodiments in the accompanying drawings, in which:

Figure 1:
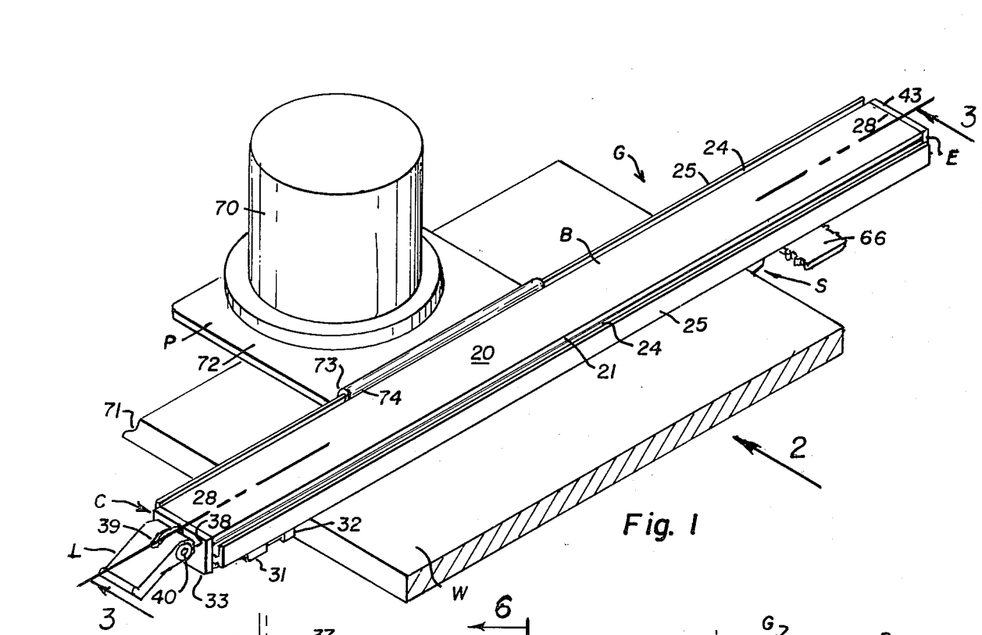
FIG. 1 is an isometric view of the improved guide clamp mounted upon and near an end of a board, the workpiece, and with an accessory slide plate connected to the bar of the guide clamp to hold a router to shape the end of the board.
Figure 2:
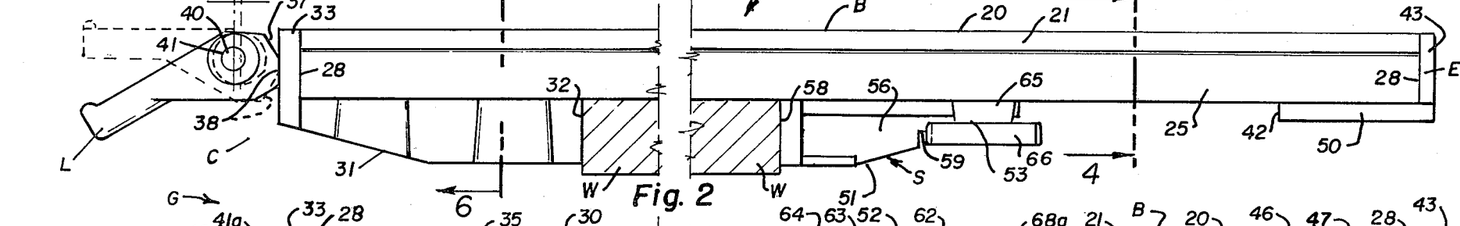
FIG. 2 is a side elevational view as from the indicated arrow 2 at FIG. 1 but on an enlarged scale and with portions broken away to conserve space.

Referring more particularly to the drawing, the improved guide clamp G includes a straight elongate bar B. A clamp jaw C is affixed to the head end of the bar, an opposing shifting jaw S is movable along the reach of the bar and an end cap E is affixed to the rearward end of the bar. The clamp and shifting jaws C and S depend from the underside of the bar B to grip the opposite edges of a workpiece W such as a board. The jaws are spaced for gripping the workpiece by moving the shifting jaw S and the bar B is then locked upon the workpiece W by depressing a lever L outstanding from the clamp jaw, as illustrated at FIGS. 1 and 2 and hereinafter further described. It is to be noted that this guide clamp G may be of any length necessary to accomodate and fit upon any workpiece with which it will be used.

The bar B is channel-shaped with a top surface 20 constituting the web portion of a channel and with legs 21 depending from the edges of the top surface 20 constituting the flange portions of the channel. The cavity 22 between these legs 21 is constricted at its lower opening by an inturned lip 23 at the bottom of each leg 21. The upper portions of the clamp jaw C and the shifting jaw S and the end cap E fit into this cavity 22. Also, a pull rod R extends longitudinally through the cavity 22 to connect with the clamp jaw lever L and the end cap E. This rod R passes through the upper portion of the shifting jaw S to engage with a locking means at the jaw S at any selected position of the jaw in the channel as will be described.

Figure 4:
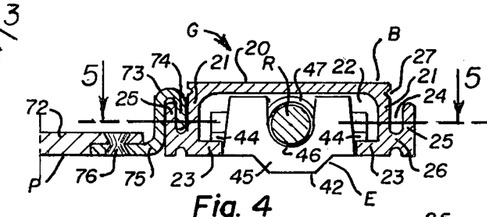
FIG. 4 is a transverse sectional elevational view as taken from the indicated line 4—4 at FIG. 2 but also showing a portion of the accessory slide plate shown at FIG. 1.
Figures 10, 11, 12, 13, 14, 15:
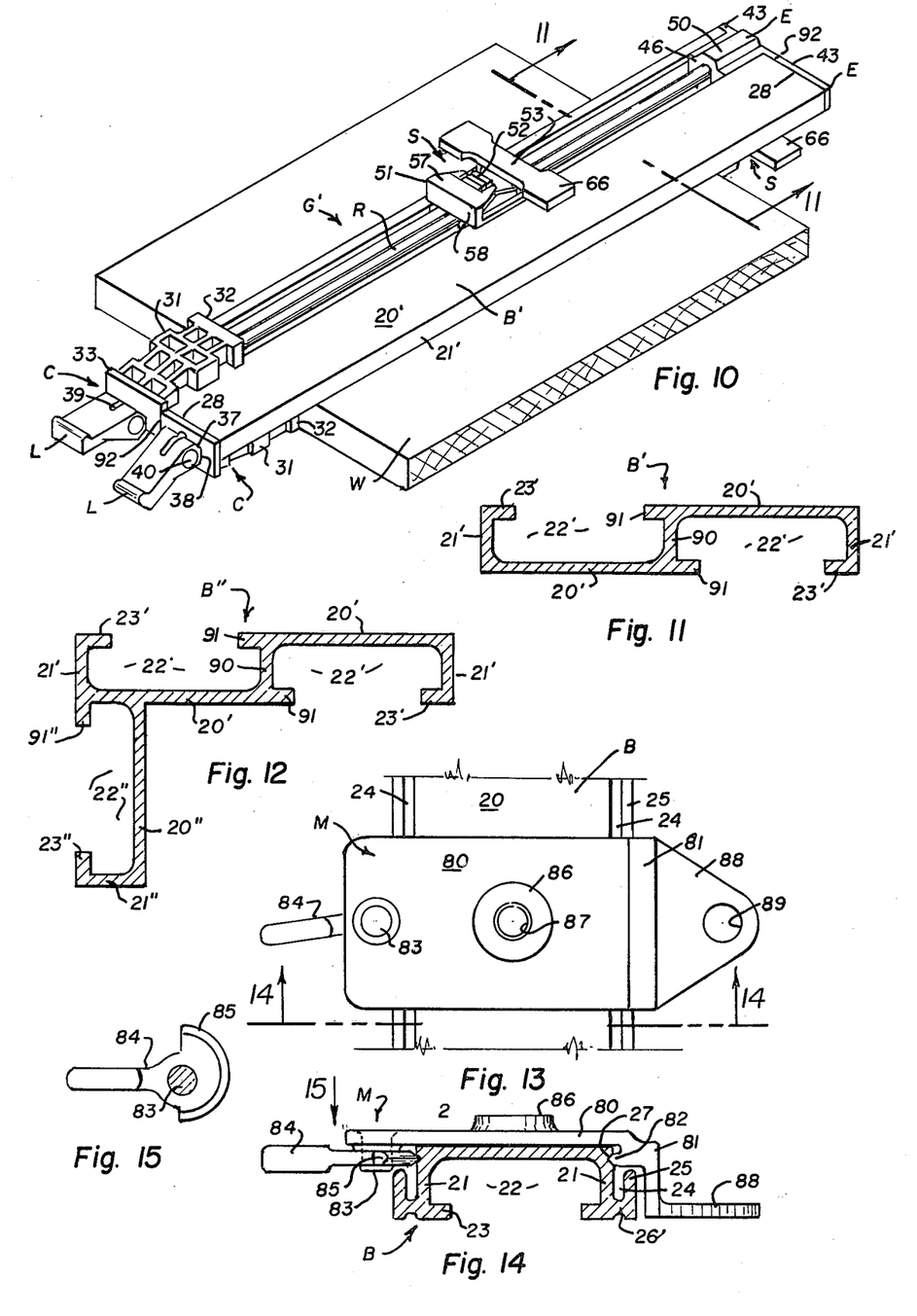
FIG. 10 is an isometric view similar to FIG. 1 but showing a double clamp unit which functions as a bench-mounted clamp vise for holding a workpiece on a bench.
FIG. 11 is a transverse sectional view of the guide bar of the double unit, as taken from the indicated line 11—11 at FIG. 10 but on an enlarged scale.
FIG. 12 is a transverse sectional view similar to FIG. 11 but showing a further modified guide bar to function as a triple unit to include a side clamp.
FIG. 13 is a fragmentary plan view of the guide clamp shown at FIG. 1 and with an accessory plate clamped upon the guide bar.
FIG. 14 is a sectional elevational view as taken from the indicated line 14—14 at FIG. 13.
FIG. 15 is a fragmentary detail of a clamping lock as viewed from the indicated arrow 15 at FIG. 14.
Figure 16:
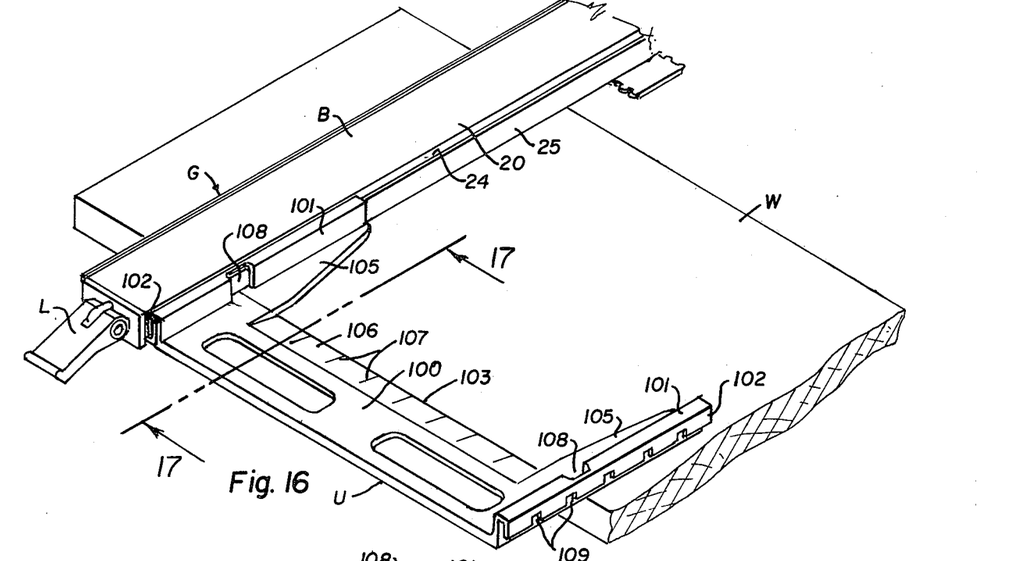
FIG. 16 is an isometric view, similar to FIG. 1 but showing an improved squaring gauge affixed to the guide clamp in position for squaring the guide clamp on a workpiece.
Figure 17:
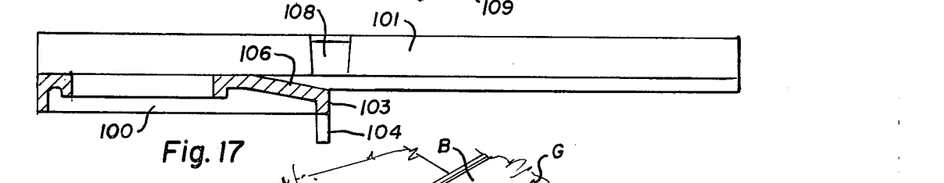
FIG. 17 is a sectional view of the squaring arm per se as taken from the indicated line 17—17 at FIG. 16 but on an enlarged scale.
Figures 18, 19, 20:
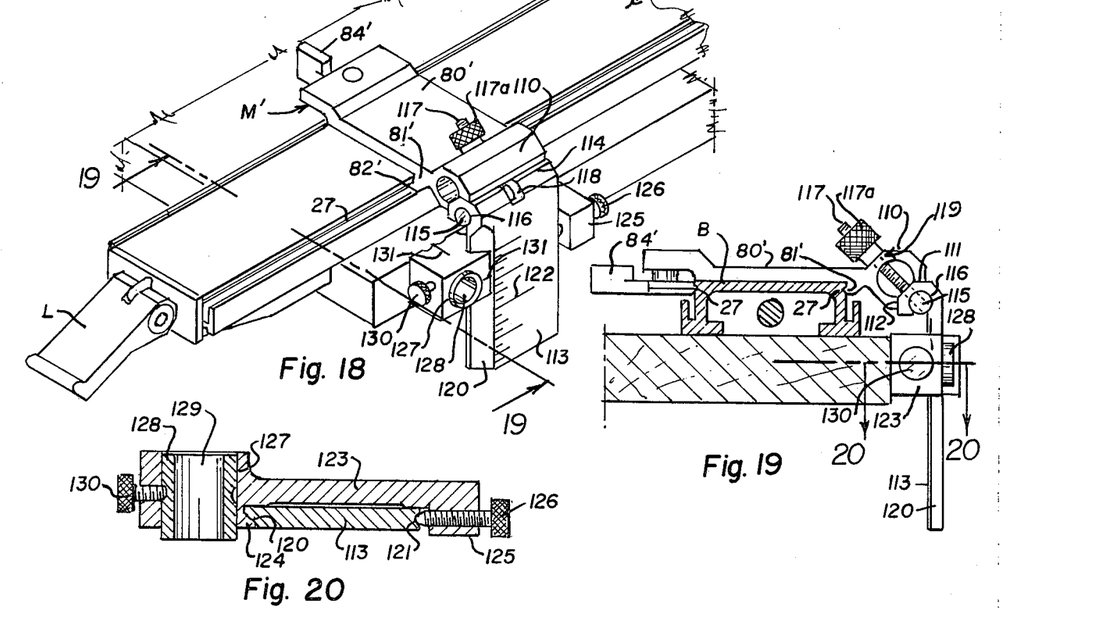
FIG. 18 is an isometric view of a portion of a guide clamp mounted on a workpiece, near an end thereof, and with an improved dowel-hole jig mounted on the guide bar to permit precise drilling of dowel holes in the workpiece.
FIG. 19 is a sectional view as taken from the indicated line 19—19 at FIG. 18 but on an enlarged scale.
FIG. 20 is a sectional view as taken from the indicated line 20—20 at FIG. 19.

When the guide clamp G is attached to a workpiece W, it can be used for a number of operations such as for marking or for guiding a power hand saw across the workpiece. Also, the guide clamp G is capable of more complex and more precise operations since the bar B is provided with guiding means capable of receiving slidable or fixed auxiliary attachments. For example, a fixed router plate P is shown at FIGS. 1 and 4, a slidable mounting head M is shown at FIGS. 13 and 14, a slidable squaring gage U is shown at FIGS. 16 and 17 and a dowel jig D is shown at FIGS. 18, 19 and 20. To hold a slidable auxiliary attachment, a slide slot 24 is formed alongside each leg 21 by a flange 25 upstanding from an outwardly projecting shoulder 26 at the base of the leg. To hold a fixed auxiliary attachment, a notched guideway 27 is located at the outer face of each leg 21 near its top edge and above the flange 25.

The channel shaped bar B is preferably a symmetrical unit to provide a neat appearance and to permit attachments to be used at either side of the bar. The bar B may be manufactured as an extrusion of aluminum or other metal, or of a hard, rigid synthetic resin plastic. The extrusion may be cut to selected lengths for economical manufacture of the bars. The only machining operations necessary will be the squaring of the ends 28 to better fit with the clamp jaw C and the end cap E. Proper extrusion will produce a straight, precisely aligned bar and it is to be noted that there will be no undue stress on the bar, to cause it to twist or bend, whenever the guide clamp is tightly clamped on a workpiece W. This is because the jaws are pulled together to grip the workpiece by the pull rod R.

Figures 6, 7, 8, 9:
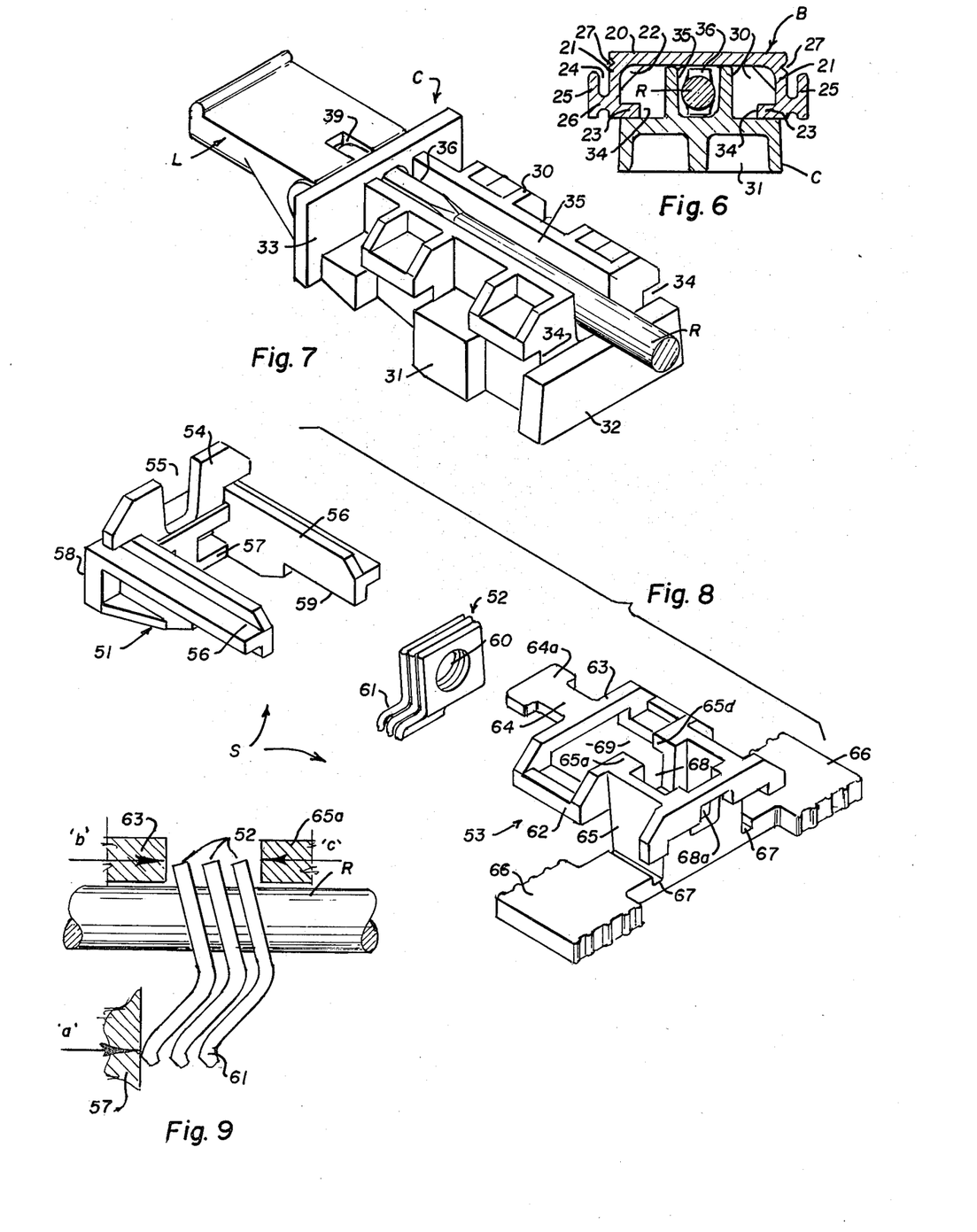
FIG. 6 is a transverse sectional elevational view as taken from the indicated line 6—6 at FIG. 2.
FIG. 7 is an isometric view of the clamping jaw of the guide clamp.
FIG. 8 is an exploded isometric view of the components of the shifting jaw.
FIG. 9 is an enlarged, diagrammatic fragmentary elevational view of locking members of the shifting jaw mounted upon a holding rod within the guide clamp and with arrows indicating pressure points for the gripping and releasing of the shifting jaw.

The clamp jaw C, as shown at FIGS. 6 and 7, consists of three parts; a support block 30 which fits into the channel cavity 22 of the bar B; an abutment 31 below the block 30 which includes the jaw face 32; and, a transverse end plate 33 which abuts against a squared bar end 28 when the support block 30 is fitted into the channel cavity 22. A neck 34 separates the support block 30 and the abutment 31 to receive the inturned lips 23 of the bar legs 21.

The clamp jaw C may be formed as a skeletal structure with pocket-like cavities in both the support block 30 and the abutment 31 in any suitable pattern such as illustrated. This cavity pattern saves material and facilitates forming a dimensionally stable unit, especially when the clamp jaw is molded from a selected strong plastic material such as nylon. It is to be noted that nylon is one preferred material for the manufacture of the clamp jaw C, the lever L, the sliding jaw S and the end cap E as with injection molding operations.

Figure 3:
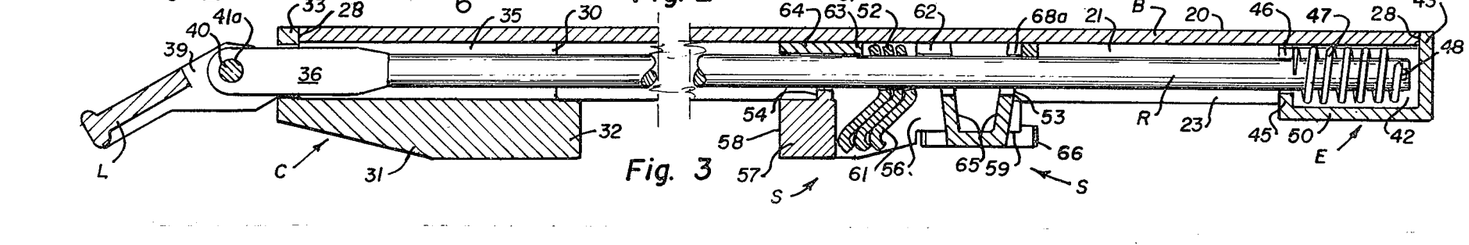
FIG. 3 is a longitudinal sectional elevational view as taken from the indicated line 3—3 at FIG. 1 but on an enlarged scale and with portions broken away to conserve space.

A central, longitudinal passaeway 35 extends through the support block 30 and through the end plate 33 to receive a flattened end 36 of the pull rod R which connects with the lever L abutted against the outer face of the end plate 33 as best shown at FIG. 3. The lever L is a rectangular member of suitable length and width for easy gripping. The transverse abutment end of this lever is enlarged to include a cam face having a release seat 37 and a clamping seat 38. Also, a central longitudinal slot 39 in this abutment end of the lever receives the flattened rod end 36. The rod R and lever L are interconnected by a pivot pin 40 extended through a transverse hole 41 in the abutment end of the lever and a mating hole 41a in the end of the rod R.

The release seat 37 of the cam face is normal to the top surface of the lever L so that the lever outstands from the end plate 33 in spaced parallelism with the top surface 20 of the bar B whenever the guide clamp is at the released position. The clamping seat 38 is angled to engage the end plate 33 whenever the lever is depressed, as from the dotted line position to the solid line position shown at FIG. 2. The radial distance of the clamping seat 38 from the axis of the pivot pin 40 is greater than that of the release seat 37, thus depressing the lever L results in pulling the rod R to effect a clamping of the jaws as hereinafter further described.

It is to be noted that the distance the lever L is depressed to engage the clamping seat 38 is such that the outer tip of the lever is not below the bottom of the jaw face 32. The height of the clamp jaw face 32 and the opposing face of the sliding jaw S is preferably slightly sess than five-eights inch. Thus, the guide clamp G can grip comparatively thin boards and plywood sheets which are lying upon a bench without the lever L or the jaws contacting the surface of the bench.

Figure 5:
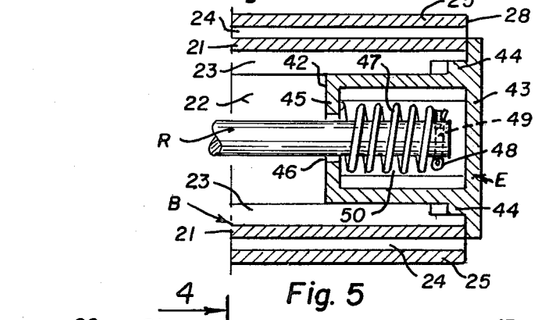
FIG. 5 is a fragmentary sectional plan view as taken from the indicated line 5—5 at FIG. 4.

The end cap E at the opposite end of the bar B is formed as an open-top, box-shaped body 42 proportioned to fit into the cavity 22 between the lips 23. The outer face of the body 42 is a transverse end plate 43 which abuts against a squared bar end 28 when the body 42 is fitted into the channel cavity 22. Ears 44 project from each side of the body 42 to rest upon the lips 23 to hold the body 42 in position in the channel cavity 22 as best shown at FIGS. 4 and 5. The inner face 45 of the body 42 has a central opening 46 through which an end of the rod R extends. A spring 47 within the body 42 and about the rod R is held in compression against the inner face 45 by a cotter pin 48 extended through a hole 49 at the end of the rod. Accordingly, the rod R is held in tension and thus holds the clamp jaw C and the end cap E in position upon the bar B. Also, the spring 47 permits the rod R to shift longitudinally within the bar B responsive to movement of the lever L. To better accommodate this spring 47, the floor 50 of the end cap is projected a short distance below the legs 21 of the bar B.

The shifting jaw S combines a jaw block 51, lock clips 52 and a shiftable release carrier 53 as best shown at FIGS. 3, 8 and 9. The jaw block 51 includes a transversely disposed head 54 which fits in the bar cavity 22 above the inturned lips 23. This head 54 is positioned at the forward side of the shifting jaw, that is, the side facing the clamp jaw C. The head includes a central passageway 55 to accommodate the rod R and a latch on the release carrier 53 as hereinafter described. A pair of spaced, opposing T-shaped guides 56 are positioned below and are extended rearwardly from the head 54 to embrace the inner faces and under sides of the inturned lips 23 and slidably connect with the release carrier 53. An abutment 57 is positioned below the head 54 and below and between the guides 56 to carry the jaw face 58. The forward portion of each guide is widened to extend downwardly and merge with the abutment 57. The rearward end of each guide 56 has an undersurface 59 which is parallel with the undersurface of the lip 23 thereabove.

The lock clips 52 are rectangular, hardened, bent plates nested thgether to function in unison. A hole 60 at the upper end of each clip is fitted upon the rod R and the lower portions of the clips fit between the guides 56 below the rod. The holes 60 are sized such that the clips 52 easily slide upon the rod R whenever the clips are normal to the rod R but the clips 52 lock on the rod whenever they are tipped from the normal. The bend of each clip 52 provides a bottom finger 61 which inclines downwardly and forwardly to cause the clip to hang at a tipped position on the rod to initiate locking and to engage the jaw abutment 57. Such engagement, as indicated by the arrow 'a' at FIG. 9, will cause further tipping and locking of the clips on the rod R whenever the shifting jaw S moves against a workpiece.

Even a slight pressure of the abutment 57 against the clips effects the locking action. Thus a fitting of the jaws 32 and 58 against the edges of a workpiece followed by a depression of the lever L moves the jaws together with a substantial force as that portion of the rod R between the jaws is shortened by the lever action. Thus, the bar B is securely held in place upon a workpiece with all tension stress being in the rod R and with minimal stresses acting on the bar B so that the bar will not bend or twist.

The release carrier 53 includes a skeletal box 62 which fits in the bar cavity 22 above the inturned lips 23. A top crossbar 63 is located at the forward end of this box to fit in the cavity above the rod R. A central latch 64 cantilevers forwardly from this crossbar 63 to extend above the rod R with the shank of the latch 64 lying in the passageway 55 of the jaw block 51 with the carrier 53 and the jaw block 51 thus fitted together. A head 64a at the extended end of the latch holds these two parts together with the length of the latch shank being such as to permit a small longitudinal movement between the carrier 53 and the jaw block 51, sufficient to effect releasing of the clips 52 from the rod R as hereinafter described.

A rectangular post 65 at the rearward portion of the box 62 extends downwardly between the jaw block guides 56 to carry a pair of wings 66 which are extended laterally from the sidewalls of the post and below the bar B. A slide slot 67 at the base of each wing 66 adjacent to the side of the post receives the under surface 59 of the adjacent jaw block guide 56 to hold the jaw block and the release carrier together. To complete this post 65, passageways 68 and 68a are provided at the upper portion of the end walls of the post and the rod R extends through these passageways.

The central portion of the box 62 is open, as at 69, to receive the tops of the clips 52. Thus, in the assembly of the shifting jaw S, the jaw block 51 and the release carrier 53 are fitted together with the lock clips 52 in place between them as illustrated at FIG. 3. The rod R is then threaded through the passageways 55 and 68 and through the lock clip holes 60. At the same time or in any suitable sequence the shifting jaw S is slid into position in the cavity 22 of the bar B and the other components, the clamp jaw C and the end cap E are connected to the rod R and are mounted in the ends of the bar B to assemble the guide clamp G.

As heretofore described, the pressure of the fingers 61 against the lock jaw abutment 57 causes locking of the lock clips 52 onto the rod R. To unlock these clips and permit movement of the shifting jaw S along the bar B, in either direction, it is merely necessary to release the lever L and to push against the conveniently located wings 66 in the direction desired. Once the lever L is released, a rearward movement of the wings 66 shifts the release carrier 53 rearwardly with respect to the jaw block 51 until the cross bar 63 engages the top of the clips 52 as at arrow 'b' at FIG. 9. The clips 52 are then squared on the rod R to release therefrom and permit rearward movement of the shifting jaw S. A forward movement of the wings shifts the release carrier and jaw block 51 forwardly and the lock clip fingers 61 move away from the jaw block abutment 57 to engage the forwardly extended ledges 65a at the top of the post 65, as at arrow 'c' at FIG. 9. The shifting jaw S then moves forwardly with a minimal effort.

The guide clamp G may be used as a single guide member for holding and marking and it may also be used with various types of auxiliary equipment as heretofore mentioned. The slidable router plate P, shown at FIGS. 1 and 4, is exemplary of a carrier for cutting and marking tools which move across a workpiece. The router 70 carries a cutter, not shown, which forms an ogee 71 or the like at the end of the workpiece W. The router plate P is a flat sheet 72 adapted to lie upon the workpiece to carry the router 70 or a similar tool. A hook-shaped follower 73 is connected to the edge of the sheet 72 adjacent to the edge of the guide clamp G. The follower 73 is formed with an elongated, downturned finger 74 which fits into the slide slot 24 of the guide clamp. An outward, downturned angled portion extended from the top edge of the finger forms a shelf 75 which connects with the sheet 72. The sheet 72 is suitably notched to receive the shelf 75 and is connected thereto as by rivets 76.

A fixed mounting head M, shown at FIGS. 13 and 14, is useful for holding jigs, templates, trammels and the like. The mounting head includes a flat, rectangular plate 80 which sets upon and overhangs the top surface 20 of the bar B. A flange 81 extends downwardly from one side of the top surface 20 and includes an inturned bevelled edge 82 which fits into the notched guideway 27 of the bar B. A pivot pin 83 depends from the opposite underside of the plate 80 to carry a thumb latch 84 having an eccentric bevelled cam 85 which fits into the adjacent guideway 27. The latch 84 is rotated to lock the holder plate 80 in position. Suitable attachment means are provided on this plate 80. A boss 86 having a tapped hole 87 may be centered at the top of the plate 80. Also, a shelf 88 may outstand from the bottom edge of the flange 81 to provide a hole 89 wherein a connector pin or the like may be fitted.

The components forming the guide clamp G may be used for other clamping purposes. FIGS. 10 and 11 illustrate a compound guide clamp G' which may be fastened upon a bench or table to hold a workpiece thereon. The compound clamp G' is essentially two clamps side by side with one clamp jaw C and shifting jaw S being turned downwardly to grip the bench and the other clamp jaw and shifting jaw being turned upwardly to grip the workpiece. In the drawing, FIG. 10, both clamp jaws C are at a common end but they may be at opposite ends of the bar B' without any structural change of components. Moreover, all components except the bar B' are essentially the same as heretofore described.

The modified bar B' is an elongate member of a double channel form, rotatively symmetrical. As such it includes top and bottom surfaces 20' at opposing sides of the bar. A side leg 21' upstands from the bottom surface 20' and a corresponding side leg 21' depends from the top surface 20'. A common central leg 90 extends between the top and bottom surfaces at the center of the bar B'. Inturned lips 23' are provided at the ends of the legs 21' and corresponding lip structures 91 are formed by short overhanging portions of the top and bottom surfaces 20'. Accordingly, the channel cavities 22' can receive the clamp and shifting jaws and end cap E as heretofore described. To permit each clamp jaw C and end cap E to fit upon the central leg 90 without changing the end plates 33 and 43, the lip structures 91 are slightly wider than the lips 23', such that the end plates 33 and 43 fit together at the common central leg 90, as at the junction 92. Another modification to the bar structure is the elimination of the slots 24 and ways 27 since they are not needed for simple clamping purposes. Finally, it may be desirable to reverse the lever L on the upwardly turned clamp jaw C so that both levers of the compound guide clamp G' are pushed downwardly for locking the jaws.

FIG. 12 shows a bar B", in section, for a further modified compound clamp where a vertical channel cavity 22" is formed. With this arrangement the triple cavity compound clamp may be secured to the top of a bench and at an edge thereof and the vertically positioned clamp can hold an upright workpiece. The surface 20" depends from the bottom surface 20'. A leg 21" having an inturned lip 23" is at the bottom of the surface 20". A corresponding lip structure 91" depends from the edge of the bottom surface 20' to complete the channel cavity 22".

The squaring gauge U, shown at FIGS. 16 and 17, is used to mount the guide clamp G squarely across a workpiece W. It also provides a marking gauge to precisely locate the guide clamp G at a selected distance from an end of the workpiece or from a mark on the workpiece. The squaring gauge U includes an abutment bar 100 with an inverted channel-shaped follower 101 above and extended laterally from each end of the bar 100, forming a U-shaped structure. Each follower 101 includes an inner leg upstanding from the upper surface of the bar 100 and a shorter outer depending leg 102 which fits into the slot 24 at the side of the guide clamp bar B. The leg 102 attaches the squaring gauge U to the forward end portion of the guide clamp G as illustrated. When so attached, the lower portion of the abutment bar 100 is at the side of the workpiece W and below the top surface thereof so that the inner edge 103 of the bar abuts against the side of the workpiece for squaring the guide clamp G. Suitable fingers 104 depend from this edge 103 to better engage the side of the workpiece.

A side wing 105 outstands from each side of the upper portion of the abutment bar 100 to lie upon the top of the workpiece and to join with and reinforce the outstanding follower 101. The top of the bar 100 between these wings 105 is sloped as at 106 to match the top with the top surface of the workpiece W. A marking scale 107 is provided on this sloped surface 106 and windows 108 are cut in each follower 101 in line with the abutment edge 103 to expose a fragment of the bar flange 25. To complete this squaring gauge U, notches 109 may be provided in the outer legs 102 to better prevent sticking of a leg 102 should sawdust or the like be in the slot 24.

The dowel jig D, shown at FIGS. 18, 19, and 20, is carried on a mounting head M' which is similar to the mounting head M heretofore described. One side of a plate 80' has a downturned flange 81' with an inturned bevelled edge 82' which fits into a bar guideway 27. A latch 84' at the opposite side of the plate 80' fits into the opposite bar guideway 27. A gripper jaw 110 outstands from the flange 81' to lie in spaced parallelism with the sides of the guide clamp bar B. The jaw is formed with an overhanging upper lip portion having an abutment face 111 at its underside and a lower lip portion having an abutment face 112 at its outward side, perpendicular to the face 111.

A flat surface gauge arm 113 is held in this gripper jaw 110 with flattened surfaces of a hook-shaped connector end 114 engaging the abutment faces 111 and 112. The flattened surfaces of the end 114 are angled 45 degrees apart with an adjacent surface angled 45 degrees from the surface of the arm 113 and with the surfaces forming part of an octagonal cylinder. With this end 114, the gauge arm can hang perpendicular from the mounting head plate 80' or the arm can swing outwardly 45 degrees or 90 degrees to be inclined with or lie parallel with the plate 80'. The connection of the gauge arm 113 to the gripper jaw 110 is effected by a T-bar which includes a pintle 115 mounted in the passageway 116 of the connector end 114 and a threaded rod 117. The rod 117 is connected to and outstands from the pintle 115 to extend through an arcuate slot 118 at the center of the connector end 114. This threaded rod 117 is fitted into a hole 119 through the jaw 110 between the abutment faces 111 and 112 to be held therein by a take-up nut 117a as illustrated.

The gauge arm 113 is a flat bar with one edge being bevelled as at 120 and the other edge being dished as at 121. A scale is provided adjacent to the beveled edge as at 122. A C-shaped guide carrier 123 is slidably mounted on this arm 113 with a lip 124 at one side to engage the bevel 120 and with a short finger 125 at the other side to carry a set screw 126 to engage the dished edge 121 and lock the carrier 123 in place on the gauge arm 113. The carrier 123 includes a socket 127 to receive a cylindrical insert 128 having a guide hole 129 of a selected drill size. The insert 128 is held in place by a set screw 130. To complete the dowel jig D gauge marks 131 are on the carrier 123 above and at the side of the socket 127 to facilitate alining a drill at a precise location in a workpiece.

The foregoing descriptions are exemplary of my invention and it is to be understood that my protection shall be limited, not by the constructions illustrated and described, but only by the proper scope of the appended claims.

I claim:

1. A guide clamp adapted to grip a workpiece between opposing jaw faces, comprising:
   (a) a bar having guideway means along the reach thereof;
   (b) a clamp jaw at one end of the bar having a jaw face facing towards the bar and a lever means adapted to be actuated to exert a pull in a direction away from the bar;
   (c) a shifting jaw carried on the guideway means, having a jaw face facing the clamp jaw and being shiftable along the bar to space the jaw faces to embrace a workpiece between them;
   (d) a pull rod extended alongside the bar with one end being attached to the lever means to be pulled thereby; and,
   (e) a lock means at the shifting jaw connecting with the pull rod to normally slide along the pull rod as the shifting jaw is moved along the bar but to lock onto the pull rod when a workpiece is embraced by the jaws whereby actuation of the lever means to pull the rod moves the jaws together to grip the workpiece.

2. The guide clamp defined in claim 1, wherein:
   (a) the pull rod extends through a passageway in the clamp jaw with its end projected from the outer face of the clamp jaw;
   (b) the lever means includes a cam which engages the outer face of the clamp jaw and a pivot means about which the lever means rotates to shift the position of the cam on the outer face of the clamp jaw; and wherein,
   (c) the pull rod is connected to the pivot means.

3. The guide clamp defined in claim 1, wherein:
   (a) an end cap means at the end of the bar opposite the clamp jaw holds the pull rod in alignment alongside the bar; and,
   (b) a resilient means at the end cap means holds the pull rod in tension and to move the shifting jaw away from a gripping position against a workpiece whenever the lever means is actuated to release its pull on the pull rod.

4. The guide clamp defined in claim 1, wherein:
   (a) the bar is a channel-shaped member having a central top surface and a leg depending from each side thereof;
   (b) the guideway means includes an inturned lip at the bottom of each leg; and,
   (c) the pull rod is carried in the longitudinal channel cavity formed by the top, the legs and the inturned lips.

5. The guide clamp defined in claim 4, wherein the clamp jaw comprises:
   (a) a head fitted into the channel cavity with a transverse end plate at the outer end of the head abutted against the end of the bar and with a passageway through the head and end plate through which the pull rod extends; and,
   (b) an abutment below the bar, alongside the head and carrying said jaw face with the abutment being connected to the head by a neck portion between the inturned lips at the channel opening.

6. The guide clamp defined in claim 5, wherein:
   (a) the lever means includes a cam which engages the outer face of the end plate
   (b) a pivot about which the lever means is rotated to shift cam engagement with the end plate and with said pull rod being connected to the pivot.

7. The guide clamp defined in claim 4, including:
   (a) an end cap having a box-like body fitted into the channel cavity adjacent to the end of the bar opposite to the clamp jaw with a transverse end plate at the end of the body abutted against the end of the bar;
   (b) An opening at the inner face of the body receiving the end of the pull rod; and,
   (c) a compression spring attached to the end of the pull rod and bearing against the inside surface of the inner face to hold the pull rod under tension, within the cavity, and in a floating state to facilitate moving the shifting jaw away from a gripping position whenever the clamp jaw lever means releases its pull on the pull rod.

8. The guide clamp defined in claim 4, wherein the shifting jaw comprises:
   (a) a jaw block having a head portion slidably mounted in the channel cavity with a passageway wherethrough the pull rod extends and an abutment below the head portion carrying the jaw face;
   (b) a lock clip means adjacent to the jaw block having a hole means through which the pull rod extends to normally slide on this pull rod but to lock thereon responsive to engagement with the jaw block; and,
   (c) a release carrier shiftably connected to the jaw block and adapted to be shifted against the lock clip means to move the lock clip means away from engagement with the jaw block and thereby release the lock clip means from the pull rod to permit the shifting jaw to shift.

9. The guide clamp defined in claim 4, wherein the shifting jaw comprises:
   (a) a jaw block having a head slidably fitted into the bar channel cavity and a centered opening in the head through which the pull rod extends, guides slideable on the inturned channel lips and an abutment extended below the guides carrying the jaw face with the guides being extended from the abutment behind the jaw face;
   (b) nested lock clips having holes through which the pull rod extends and being mounted on the rod behind the jaw block, with the holes being sized to slide on the pull rod when the clips are normal to the rod but to lock on the pull rod when the clips are tipped and with the clips having inclined fingers extended below the pull rod to engage the abutment behind the jaw face whereby movement of the abutment against the fingers tips the lock clips to lock the shifting jaw onto the pull rod;

(c) a release carrier in the channel cavity behind the jaw block formed as a skeletal box with openings through which the pull rod extends and including a cross bar above the pull rod adjacent to the jaw block abutment and a ledge surface spaced rearwardly therefrom with portions of the lock clips being positioned between the cross bar and the ledge surface, the release carrier being shiftable with respect to the jaw block whereby the cross bar will engage the lock clips when the release carrier is shifted rearwardly away from the jaw block to pull the lock clip fingers away from the jaw block abutment and thereby release the lock clips from the pull rod for rearward movement of the shifting jaw, away from the clamp jaw, and the ledge surface will engage the lock clips when the release carrier is shifted towards the jaw block to move the shifting jaw towards the clamp jaw as agsinst a workpiece; and, (d) a post attached to the release carrier frame extended below the bar with engagement wings thereon to facilitate moving the release carrier and a loose latch means between the jaw block and the release carrier to limit the extent of relative movement between the two.

10. The guide clamp defined in claim 4, wherein:
(a) the bar is formed as a double-channel member with an upwardly facing channel and a downwardly facing channel; and,
(b) each channel member carries an aforesaid clamp jaw, shifting jaw, pull rod and lock means, whereby the guide clamp may be fastened onto a workbench or the like with one set of jaws and hold a workpiece in the other set of jaws.

11. The guide clamp defined in claim 1, including a slide slot alongside the bar adapted to receive the slide finger of an auxiliary tool-carrying means.

12. The guide clamp defined in claim 1, including guide way notches at the sides of the bar adapted to receive a clamp-on mounting means.

13. A guide clamp including a bar having a top surface, leg means at each side thereof and a jaw clamping means at the undersurface adapted to clamp the bar onto the surface of a workpiece, the improvement comprising:
(a) a slot alongside a leg surface;
(b) a plate means adapted to lie upon the surface of the workpiece; and,
(c) a follower means at one side of the plate means with an overhanging finger adapted to slidably fit in the slot.

14. The guide clamp combination defined in claim 13, wherein the plate means includes a tool means and is adapted to be moved across the workpiece alongside the guide clamp.

15. The guide clamp combination defined in claim 13, wherein said plate means includes an abutment means adapted to abut against an edge of the workpiece whereon the guide clamp is mounted, with said abutment means being perpendicular to the follower means whereby said plate means serves to square the guide clamp on the workpiece.

16. The guide clamp combination defined in claim 15, wherein:
(a) a slot is provided alongside each leg surface; and,
(b) a follower means is provided at each side of the abutment means whereby the plate means can be mounted in a slot at either side of the bar.

17. In combination with a guide clamp including a bar having a top surface, leg means at each side thereof, a guideway on each leg means and a jaw clamping means at the undersurface of the bar to clamp the bar onto the surface of a workpiece near the end of the workpiece, a dowel jig for drilling holes in the end of the workpiece comprising:
(a) a mounting plate adapted to set upon the top surface of the bar with a flange means and a lock means depending from the sides of the mounting plate to engage the guideways and secure the mounting plate onto the bar;
(b) a gripper jaw at one side of the mounting plate;
(c) a gauge arm having connecting means at one end thereof adapted to secure the arm to the gripper jaw to depend therefrom alongside the workpiece; and,
(d) a carrier slidable on the gauge arm to be selectively set thereon and having a drill guide hole therein which may be directed towards the end of the workpiece at any selected position.

* * * * *